March 9, 1943. W. DINNES 2,313,522
WALL ANCHOR
Filed Sept. 27, 1941
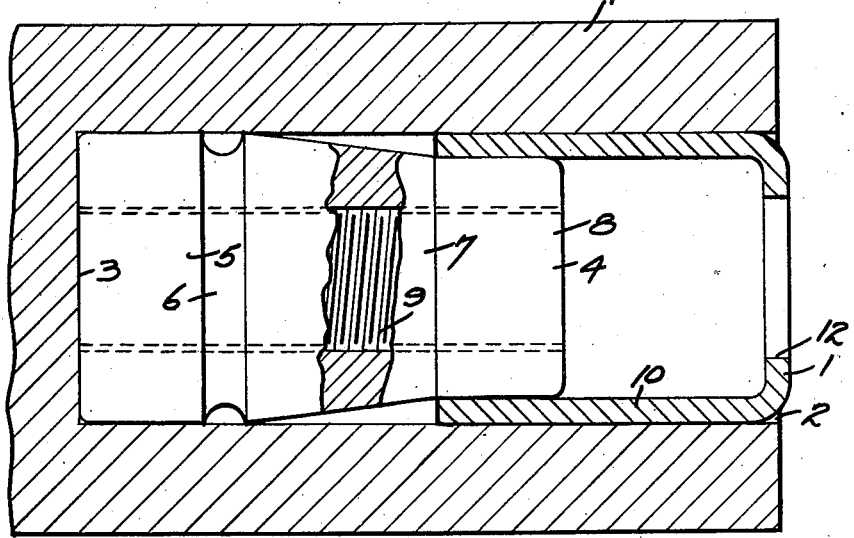
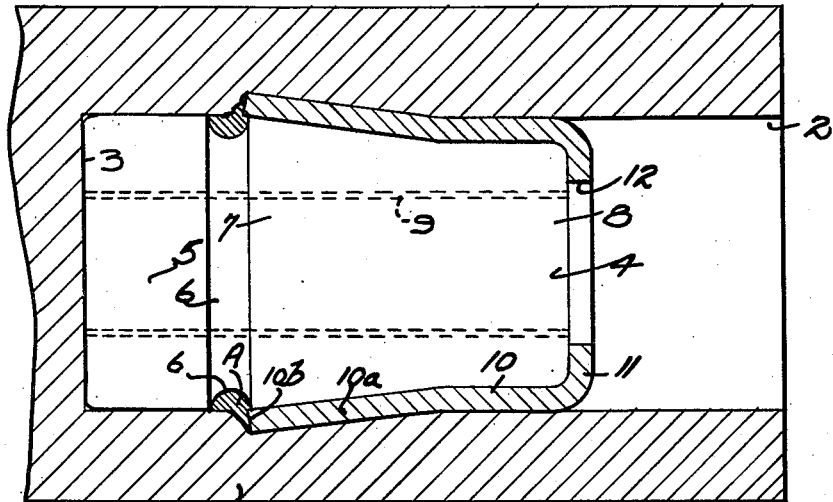
INVENTOR.
William Dinnes
BY
his Attorney.

Patented Mar. 9, 1943

2,313,522

UNITED STATES PATENT OFFICE 2,313,522

WALL ANCHOR

William Dinnes, Avon Township, Oakland County, Mich.

Application September 27, 1941, Serial No. 412,569

3 Claims. (Cl. 72—105)

This invention relates to improvements in wall anchors. It has long been a common practice to cut openings in a wall and to insert an anchor into each to receive and engage a screw or other fastening means so that the several screws thus engaged will support any one of a large range of articles, such as a sink, closed tank or the like.

Such wall anchors often consist of an externally tapered and internally threaded bushing and a soft metal sleeve internally tapered to coact with the bushing taper so that when the sleeve is driven axially upon the bushing it is circumferentially expanded to occupy the entire cross section of the opening in which it is seated. This type of wall anchor is, however, subject to the objection that while the soft metal sleeve readily expands to fill the opening it does not make firm engagement with the peripheral wall of the opening and can consequently be readily pulled out. Again in such an arrangement the external diameter of the sleeve always remains the same throughout its length so that any tendency of the sleeve to engage the peripheral wall of the opening is uniformly exerted throughout the entire length of the sleeve, and as the latter is only formed of soft metal it cannot be forced sufficiently into engagement with the wall of the opening to prevent detachment of the anchor if outward pull is exerted thereon.

It is an object of this invention to provide a wall anchor including a tapered bushing and a coacting sleeve, so that as the latter is forced axially along the bushing periphery it is radially progressively expanded and its peripheral portion thus enlarged is forced into intimate contact with the peripheral wall of the opening in which the anchor is seated.

Another object of the invention is to provide such a wall anchor wherein the bushing is so arranged that its small end is positioned toward the open end of the opening so that as the sleeve is driven axially therealong the inner end of the sleeve is progressively expanded to engage and cut into the peripheral wall of the opening. In that way I provide a wall anchor wherein the sleeve is so constructed and arranged that a pull exerted upon the bushing to remove it merely brings the sleeve periphery into firmer engagement with the periphery of the wall opening.

Another object of the invention is to provide a wall anchor wherein the end of the bushing which lies toward the closed end of the wall opening is of uniform diameter and substantially the same size as the wall opening to support said bushing and retain the latter substantially parallel with the axis of the opening; and wherein an annular groove is formed around the bushing between its said end of uniform diameter and an intermediate tapered portion by which the sleeve is expanded, so that cuttings from the wall as the sleeve is inwardly advanced may collect in the groove.

Having thus briefly stated some of the objects and advantages of the invention I will now proceed to describe a preferred embodiment thereof with the aid of the accompanying drawing, in which:

Figure 1 illustrates a section of a part of a wall with my wall anchor therein, the sleeve resting over the outer parallel portion of the bushing, and Figure 2 is a similar view to Figure 1 but shows the sleeve driven onto the bushing to engage the peripheral wall of the opening.

Referring to the drawing, I designates a wall in which an opening 2 has been formed. This opening is of substantially uniform cross section throughout its length, and inserted therein and resting against the back wall 3 thereof is a bushing 4 the rear portion 5 of which slides freely in the said opening. An annular groove 6 formed around the bushing 4 constitutes the front boundary of the rear portion 5, and forwardly from this groove is an intermediate tapered portion 7 of the bushing of forwardly decreasing diameter. This tapered intermediate portion 7 terminates in a front extremity 8 of the bushing which is of uniform diameter throughout the length of the said extremity. The bushing 4 is internally threaded at 9 throughout its length to receive a screw—not shown.

The sleeve 10 is of uniform diameter both externally and internally throughout its length and its internal diameter is such as to slide freely over the front extremity 8 of the bushing 4. Formed integral with the outer extremity of the sleeve 10 is an annular internal flange 11 the opening 12 through which is somewhat larger than and concentric with the internal thread 9 of the bushing 4 to provide ready access thereto.

When the bushing 4 has been placed in the opening 2 with its rear portion 5 resting against the back wall 3 of the said opening the sleeve 10 is placed around the front extremity 8 of the bushing. As the said extremity 8 is of uniform diameter throughout its length and the bore of the sleeve 10 is a sliding fit thereover the sleeve readily slides to the position shown in Figure 1. Then by applying pressure against the flange 11, or striking the latter, the sleeve may be gradually driven to the position shown in Figure 2. During this movement the front extremity of the sleeve is gradually circularly expanded, that is progressively outwardly tapered from its rear extremity as shown at 10a, by contact with the intermediate tapered portion 7 of the bushing. The annular extremity 10b of the sleeve then forms a cutting edge which progressively cuts deeper portions of the wall 1 away, and rearwardly increases the diameter of the opening 2. The flange 11 acts as a stop to limit the inward movement of the sleeve 10 relative to the bushing 4. Due to the provision of the annular groove 6 particles cut from the wall 1 as the sleeve 10 is driven inwardly and expanded accumulate in the said groove and thus permit the sleeve to travel rearwardly to a position adjacent the rear portion 5 of the bushing, which would otherwise be prevented by cuttings which now fall into the groove as indicated at A.

While in the foregoing the preferred embodiment of the invention has been described and shown, it is understood that alterations and modifications may be made thereto provided the said alterations and modifications fall within the scope of the appended claims.

What I claim is:

1. A wall anchor comprising a bushing having its rear portion of uniform diameter to fit the bore of a wall opening, the front portion of the bushing being of smaller diameter and its intermediate portion being tapered and of rearwardly increasing size, a sleeve mounted to slide upon the smaller front portion of the bushing and into said bore, said bushing and sleeve being of relatively hard material whereby when the sleeve is driven rearwardly over the tapered intermediate portion of the bushing it is progressively expanded thereby and cuts said bore intermediately of the length of the latter so that that portion of the bore of the wall opening becomes of rearwardly increasing size thereby anchoring said bushing and sleeve in said bore, and said bushing being provided with means for engaging a fastening means.

2. A wall anchor comprising the combination set forth in claim 1, wherein an annular groove is formed around the bushing at the rear of its tapered portion to receive wall cuttings as the size of the bore of the wall opening is increased.

3. A wall anchor comprising an annular bushing internally threaded, said bushing having its rear portion of uniform diameter to fit into the bore of a wall opening, the front portion of the bushing being of smaller diameter and its intermediate portion being tapered and of rearwardly increasing diameter, a sleeve of uniform diameter mounted to slide upon the smaller front portion of the bushing and into said bore, said bushing and sleeve being of relatively hard material whereby when the sleeve is driven inward it is rearwardly expanded by the intermediate tapered portion of the bushing and cuts said bore intermediately of its length so that that portion of the bore of the wall opening becomes of rearwardly increasing size thereby anchoring said sleeve and bushing in said opening, and an internal annular flange formed upon the front extremity of said sleeve.

WILLIAM DINNES.